July 21, 1942.  J. WIRGIN  2,290,400
CAMERA STAND
Filed May 2, 1940
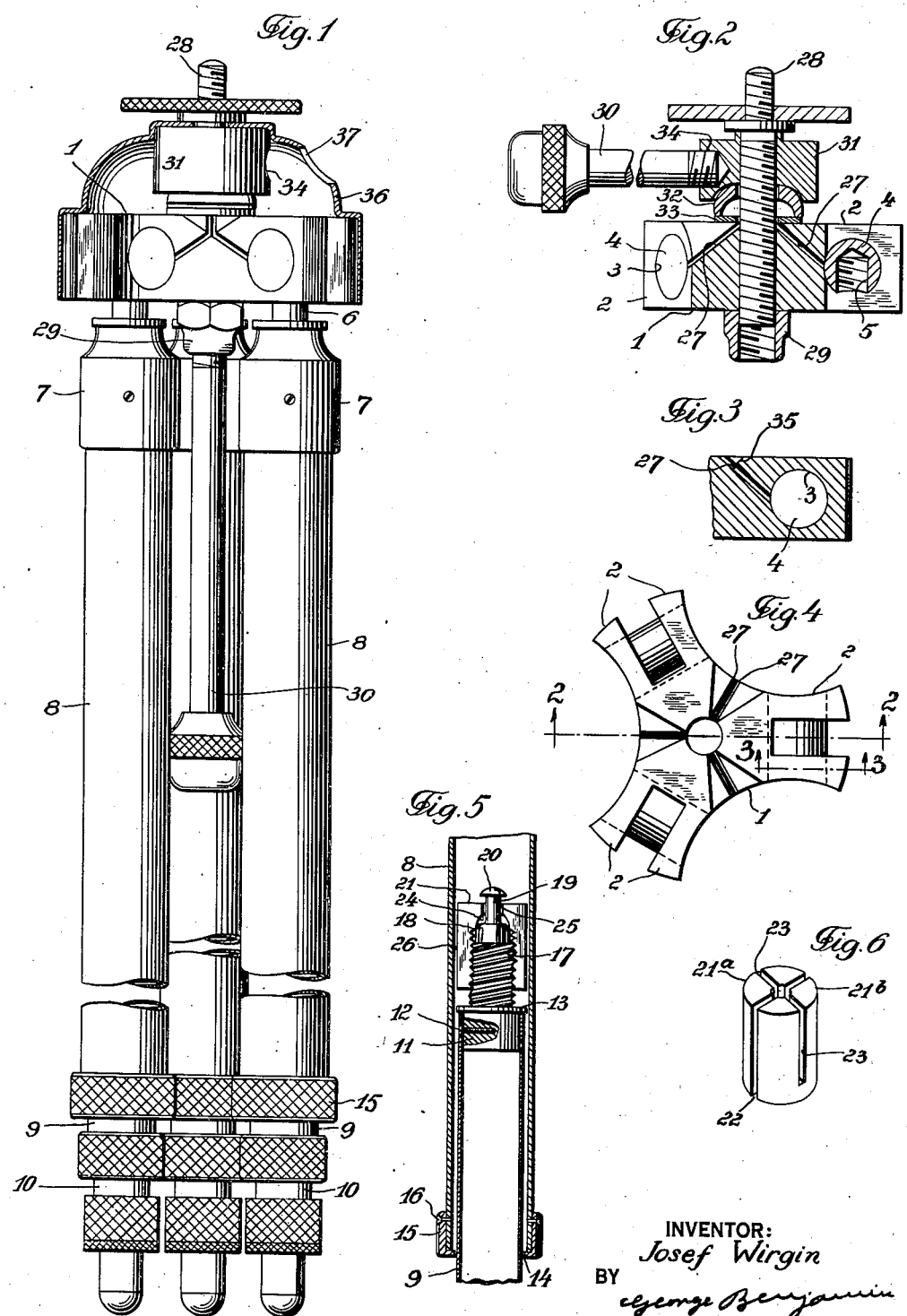
INVENTOR:
Josef Wirgin
BY
ATTORNEY Patented July 21, 1942

2,290,400

UNITED STATES PATENT OFFICE 2,290,400

CAMERA STAND

Josef Wirgin, New York, N. Y.

Application May 2, 1940, Serial No. 332,857

1 Claim. (Cl. 248—191)

The object of the invention is a tripod or camera stand of the kind having telescopic legs consisting of tube sections adapted to be secured in any desired longitudinal adjustment by frictional locking means provided within these sections, and engageable and disengageable by relative rotation of said sections.

Said locking means usually consist of a screw nut having a limited axial mobility along a screw stud of the inner tube section and adapted, by means of a tapered spreader member, either to engage directly the inner wall of the coordinated outer tube section or to press separate friction members or jaws against said wall.

It has been found, however, that said nut has a troublesome tendency to bind i. e. to get stuck on said screw, thereby making the locking device inoperative, and that this drawback cannot be eliminated satisfactorily by providing the nut with deep slots making it elastic and expansible.

Therefore positive means have been found necessary making possible an enforced and not only frictional rotation of said nut on said screw.

In one embodiment said positive means consist of a projection or tooth provided at the end of the outer tube section and adapted to enter a corresponding notch of the nut. This arrangement has the disadvantage that for engaging said tooth into said notch it is necessary to pull out the corresponding leg section to the very limit which means an inconvenience in use.

To avoid this it has been proposed to give the outer tube section a polygonal cross section. This, however, increases the weight and production costs of the tripod, affects its appearance and makes it inconvenient to use more than two telescope sections per leg.

The inventor has found that all these difficulties and drawbacks can be avoided by the surprisingly simple and effective expedient of having said nut consisting of at least two completely separate sector pieces freely movable radially relative to each other.

In the drawing an embodiment of the object of the invention is shown by way of example.

Fig. 1 is an elevation of the tripod in the position of non-use, top cover shown in section;

Fig. 2 is a vertical section through the top of the tripod and through the adjacent parts on the line 2—2 of Fig. 4;

Fig. 3 is a vertical section on the line 3—3 of Fig. 4;

Fig. 4 is a plan view of the top member alone;

Fig. 5 is a vertical section through one of the legs showing the frictional locking device for the longitudinal adjustment of the legs;

Fig. 6 is a perspective of the two-part-nut of said locking device.

The top member 1 has three forked arms 2 traversed by cylindrical holes 3 in which pivots 4 are journalled. These pivots 4 have radial screwthreaded holes 5 into which studs 6 of the legs 7 are screwed. These legs consist of upper cylindrical tube sections 8 in which telescope middle cylindrical tube sections 9 in which in turn telescope lower cylindrical tube sections 10. The construction being the same for each pair of tube sections it will be sufficient to describe one pair.

The section 9 is closed at the upper end by a plug 11 secured in place by a screw 12 and having a projecting flange 13 adapted to abut against an inwardly projecting flange 14 of a collar 15, held at the end of the section 8 by a screw 16, for limiting the outward movement of the section 9.

A screw stud 17 is integral with the parts 11 and 13 and has at its upper end a rounded or bell shaped cam part 18 and a constricted plain stud 19 with a head 20.

The screw stud 17 engages into a cylindrical screw nut 21 consisting, in accordance with the invention, of two completely separate and independent parts 21ª and 21ᵇ separated by the throughgoing slot 22. For making these parts elastic they may be provided with slots 23 terminating at some distance from the lower end of the nut and not forming part of this invention.

The halves 21ª and 21ᵇ are held together only by the encircling tube 8. In the upper part of the nut 21 is a tapered bellshaped cavity 24 and a bore 25 for the passage of the stud 19.

In the position of the parts shown in Fig. 5 the nut 21 fits loosely into the tube 8 that is indicated by the open cylindrical slot 26 in an exaggerated manner. In this position the tubes 8 and 9 can be freely telescoped relative to each other.

If, however, the tube 9 is rotated clockwise the not connected parts 21ª, 21ᵇ tend to fall apart and to lean against the inner wall of the tube 8. Consequently between said wall and said parts friction is caused which tends to prevent said parts from rotation with the tube 9. Therefore the screw 17 moves upward in the nut 21, and the cam 18, by entering the constricted upper part of the conical cavity 24, tends to separate from each other the parts 21ª and 21ᵇ and presses them firmly against the inner wall of the tube 8 so that they act as a brake preventing further longitudinal or telescopic adjustment.

For good brake action the part 8 on the one hand and the parts 21ª, 21ᵇ on the other hand should consist of different metals, e. g. part 8 of aluminum alloy, and parts 21ª and 21ᵇ of brass.

The nut 21 in accordance with this invention of course may consist of more than two parts.

For fixing the legs 7 in their angular adjusted position in use the forked arms 2 of the top member 1 are provided with slots 27 extending through the inner sides of the bearings 3 and converging upwardly and inwardly towards the center of said top member.

In this center is provided the usual screw 28 for the attachment of a camera. The lower end of this screw supports a screw nut 29 into which a lever or wrench 30 may be screwed in the position of rest shown in Fig. 1.

For all purposes the parts 1, 28 and 29 may be considered an integral piece of metal.

The screw 28 engages into a cylindrical screw nut 31 beneath which is located a dished washer 32 and a plain washer 33. The nut 31 has a screw threaded bore 34 into which the lever 30 may be screwed as shown in Fig. 2 for exerting considerable force on the nut 31.

When the angularity of the legs 7 has been adjusted in use the nut 31 is screwed down and, by means of the washers 32, 33, tends to narrow all the three slots 27 simultaneously thereby clamping the pivots 4 in the bearings 3 and fixing said angularity.

The inward and upward inclined arrangement of the slots 27 is of considerable advantage.

First of all by the slots relatively long lever arms 35 (Fig. 3) are confined are confined affording a strong leverage for clamping the pivots 4 in the bearings 3.

Secondly pressure members 31, 32, 33 of a relatively small radius are sufficient.

Thirdly a good closed appearance is obtained and outwardly projecting sharp ends of slots are avoided. Hence no casing is necessary for the top member 1. If desired, however, a bell shaped casing 36 provided with an opening 37 for the passage of the lever 30 may be provided as shown in Fig. 1.

What I claim is:

A telescopic leg for a tripod comprising, in combination, cylindrical tube sections and at least one frictional locking device engageable and disengageable by relative rotation of said tube sections and adapted to lock said tube sections in their longitudinal adjusted positions, said locking device comprising an expansible screw nut, a screw stud engaged by said nut, and a spreader, said screw stud being connected with one of said tube sections and having a limited axial mobility relative to said nut, said nut being expansible against the inner wall of the coordinated other tube section by said spreader, said nut consisting of at least two completely separate sector pieces freely movable radially relative to each other.

JOSEF WIRGIN.